Figure 1:
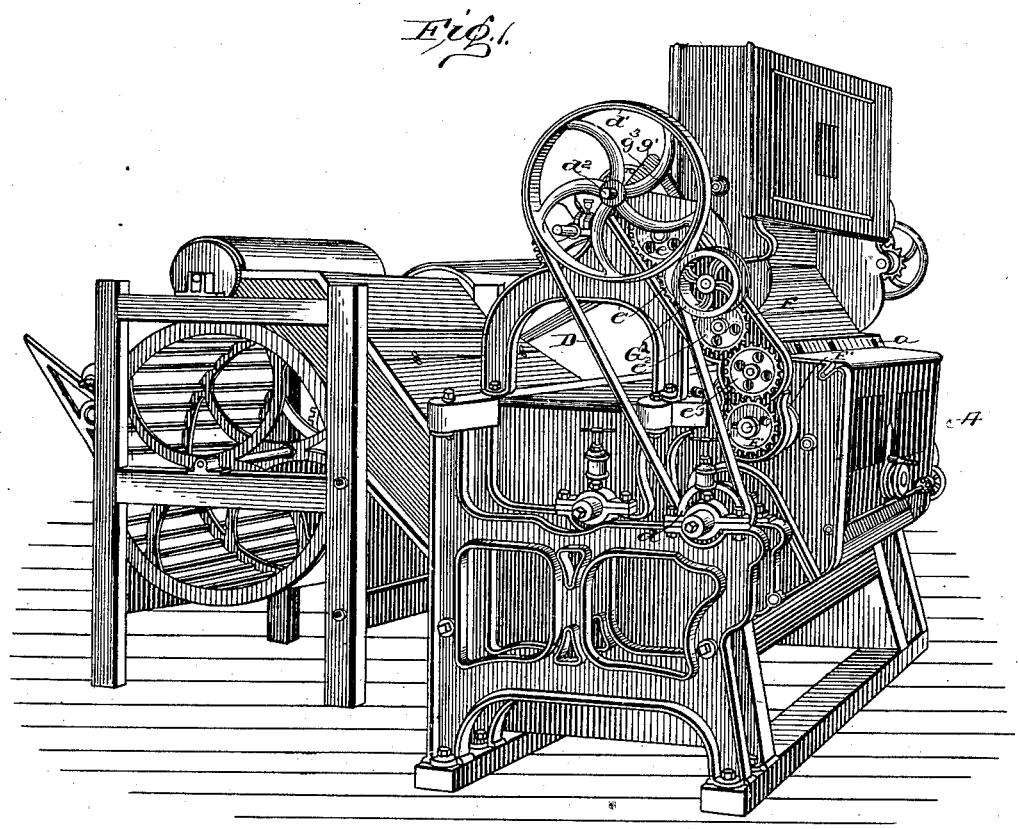

No. 696,959. Patented Apr. 8, 1902.
J. M. GARDNER.
COTTON SEED DELINTER.
(Application filed Jan. 18, 1901.)

(No Model.) 3 Sheets—Sheet 1.

Witnesses:

Inventor
Jefferson M. Gardner
By, David Mead
Atty

No. 696,959. Patented Apr. 8, 1902.
J. M. GARDNER.
COTTON SEED DELINTER.
(Application filed Jan. 18, 1901.)
(No Model.) 3 Sheets—Sheet 2.

Witnesses: Inventor

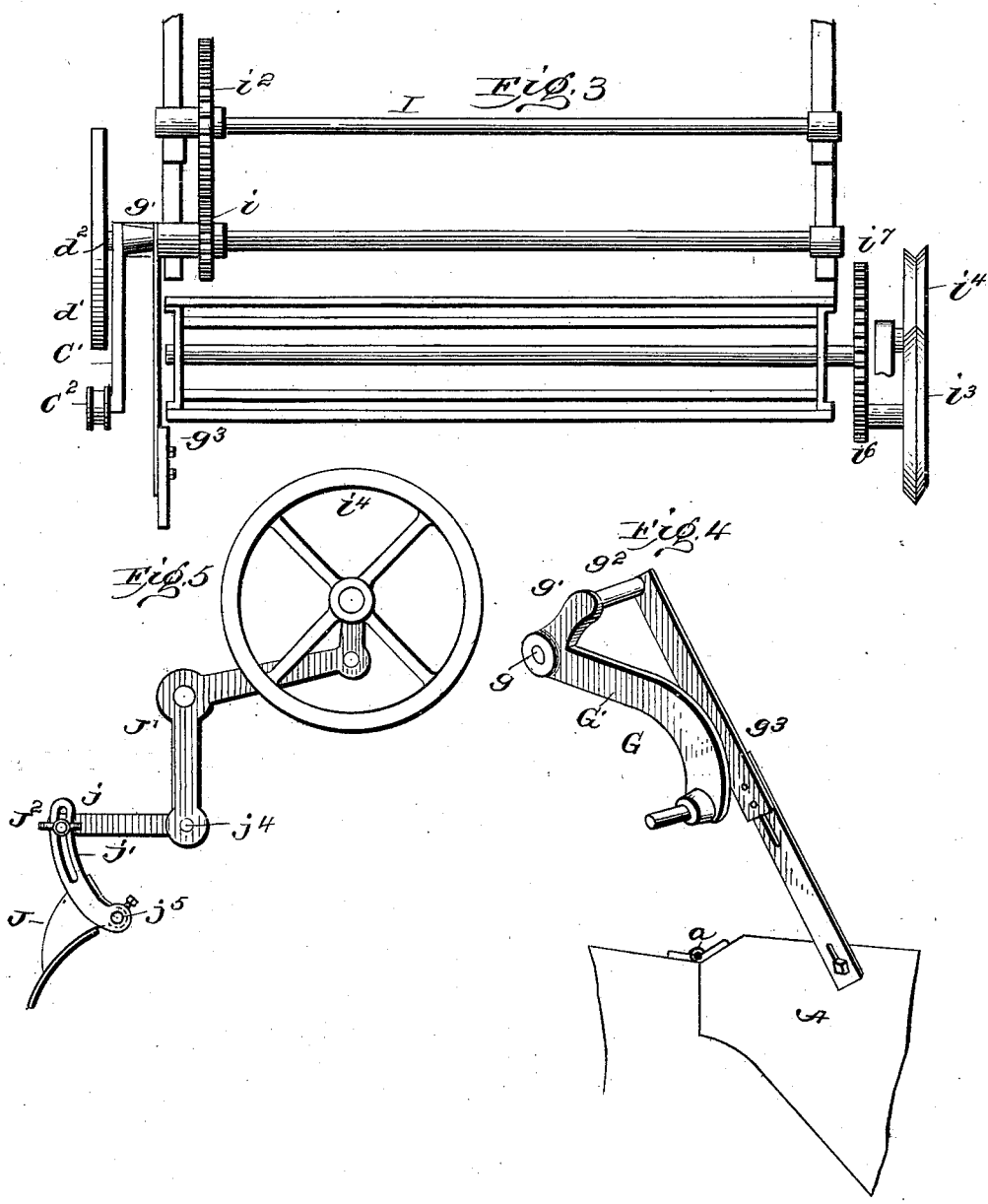

UNITED STATES PATENT OFFICE.

JEFFERSON M. GARDNER, OF NEW LONDON, CONNECTICUT.

COTTON-SEED DELINTER.

SPECIFICATION forming part of Letters Patent No. 696,959, dated April 8, 1902.

Application filed January 18, 1901. Serial No. 43,734. (No model.)

*To all whom it may concern:*

Be it known that I, JEFFERSON M. GARDNER, a citizen of the United States, residing at New London, in the county of New London and State of Connecticut, have invented certain new and useful Improvements in Cotton-Seed Delinters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to machines for delinting cotton-seed preparatory to the extraction of oil from the seed.

The primary object of the invention is to provide a delinting-machine of the kind in which a series of revolving saws are brought into contact with the seed from which the lint is to be removed, wherein the cotton-seed may be fed to the saws in a more efficient and practical way than has been possible in machines of this kind as heretofore constructed.

Further, the object of the invention is to provide a cotton-seed-delinting machine wherein the cotton-seed to be operated upon shall be given a positive movement during the operation of the machine to constantly present new seed to the action of the saws.

Further, the object of the invention is to provide a cotton-seed delinter wherein the operation of the machine may instantly be stopped by hand, and whereby, also, the feeding of cotton-seed to the roll-box may automatically be stopped when an excess of seed is present in the roll-box.

With these objects in view the invention consists, essentially, of a cotton-seed-delinting machine comprising a series of circular saws, a float arranged adjacent to the saws, and means for imparting motion to the float, consisting of a train of gears maintained constantly in engagement with the shaft by which they are driven, with the float-shaft, and with each other and also capable of independent lateral movement.

Further, the invention consists of a cotton-seed delinter comprising a series of circular saws, a movable roll-box adjacent to the saws, a float in the roll-box, means for driving the float, and a connection between the roll-box and the driving mechanism, whereby when the roll-box is moved away from the saws the rotation of the float is stopped.

Further, the invention consists of a cotton-seed-delinting machine comprising a roll-box having a portion of its inner face movable, a feeding device, and a novel connection between the movable portion and the feeding mechanism, whereby when roll-box contains an excess of seed the action of the feeding mechanism will be stopped automatically.

The invention consists, finally, in various novel details of construction, substantially as hereinafter described and claimed, whereby the objects of the invention are attained.

The invention is illustrated in the accompanying drawings, in which—

Figure 2:
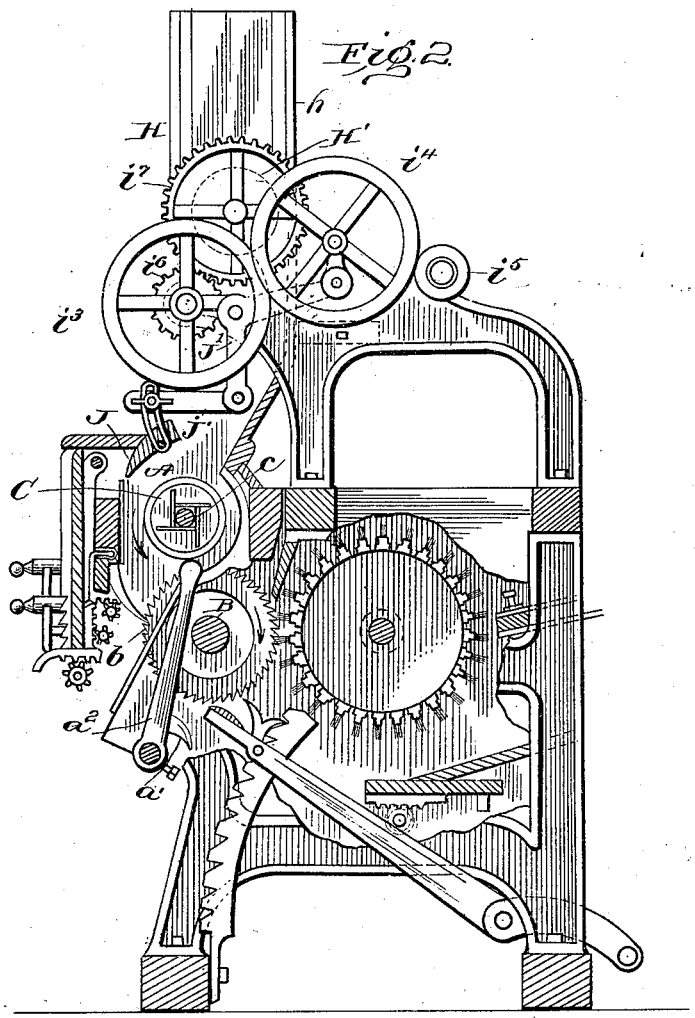
Figure 6:
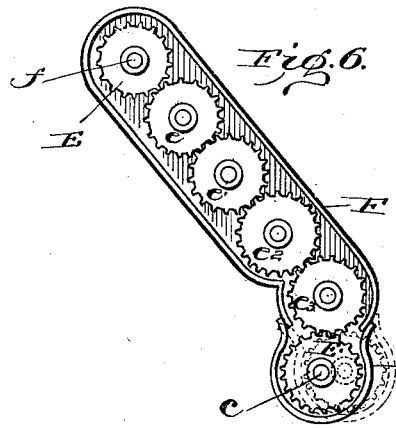

Figure 1 is a perspective view of a cotton-seed-delinting machine embodying my invention, the outer portion of the casing of the float-driving gear being removed. Fig. 2 is a view, partly in section and partly in side elevation, showing the opposite side of the machine from that shown in Fig. 1. Fig. 3 is a front view of the feed-cylinder and the mechanism for driving the same removed from the casing. Fig. 4 is a detail view of the means whereby the movement of the roll-box float is stopped when the roll-box is raised. Fig. 5 is a detail view of the means for stopping the operation of the feeder when the roll-box contains an excess of seed; and Fig. 6 is a side view of the casing of the float-gears, showing by dotted lines the position of the movable part when the roll-box is raised.

In the drawings, A represents the roll-box, which is attached to the main frame of the machine by hinges $a$, permitting the raising and lowering of the box. The weight of the box and the parts attached thereto maintains the box in normal position, while the raising is accomplished when desired by a cam $a'$, mounted on the frame of the machine adjacent to the lower end of the roll-box in a position to contact with the lower face of the end of the box when the lever $a^2$, attached to the cam, is moved forward.

The saw-shaft B is mounted in the frame of the machine in such position that when the roll-box is in its normal position the saws $b$ project into the roll-box a proper distance to operate upon seed contained in the box. The saw-shaft receives motion from any suitable source, and from it are driven all the other movable parts of the linting and feeding mechanism.

The float C is mounted approximately in the center of the roll-box and receives rotary motion and has its motion stopped on the raising of the roll-box from the same by the mechanism to be described.

It has been found that in cotton-seed-delinting machines wherein rotating saws are brought into contact with the seed to remove the fiber that the best results can be obtained only by insuring a continuous uniform movement of the float, by which the seed in the roll-box is moved constantly to present new seed for the action of the saws.

The driving mechanism by which the float is rotated receives motion through a belt D, passing over a pulley $d$ on the saw-shaft B and a band-wheel $d'$, mounted on a shaft $d^2$, arranged in the upper portion of the frame of the machine. On the shaft $d^2$ is keyed a gear-wheel E, and a corresponding gear-wheel E' is keyed to the shaft $c$ of the float C. The gears E and E' are connected and rotary motion transmitted from the shaft $d^2$ to the float by the intermeshing gears $e$ $e'$ $e^2$ $e^3$, forming a train for transmitting movement. The gears are all inclosed in a casing F, which has on its inner faces bearings for the intermediate gears. The casing is supported on the shaft $d^2$, being provided on opposite sides near its upper end with projections $f$, having openings therethrough for the reception of the shaft. The lower portion of the casing is composed of a part F', movable with respect to the upper portion of the casing. This movable part is pivoted on one side, and the other sides overlap the lower end of the upper part of the casing, and is of a size to completely inclose the gear E', contained therein, during any movement of which the roll-box by which the gear E' is carried is capable.

The belt D is rendered operative or inoperative by the belt-tightener G. This consists of an arm G', having at its upper end an opening $g$, receiving the shaft $d^2$, upon which the arm is loosely mounted, and the idle wheel G², arranged in line with the belt D. The position of the arm is governed by the position of the roll-box. When the latter is in position to have cotton-seed carried by it operated upon by the saws $b$, the idle wheel presses upon the belt to tighten it, and when the roll-box is raised the belt is loosened and ceases to drive. To effect this, the arm G' has an upward-projecting finger $g'$, having a pin $g^2$ extending therefrom at right angles, and the pin is connected to the roll-box by a link $g^3$. The link is made in sections overlapping at their meeting ends, and each section has near its inner end an elongated slot, through which pass headed bolts, permitting adjustment to increase or lessen the length of the link to insure imposing proper pressure on the belt when desired irrespective of the length of the belt.

Arranged above the roll-box is the feeder H, from which cotton-seed is supplied to the roll-box. The feeder consists, essentially, of the casing $h$ and the feed-cylinder H', mounted therein. Motion is given the feed-cylinder from the shaft $d^2$ through the pinion $i$, mounted on the shaft $d^2$, the shaft I having thereon the gear-wheel $i^2$, the friction-wheels $i^3$, $i^4$, and $i^5$, the pinion $i^6$, and the gear $i^7$, mounted on the feed-cylinder shaft. All the parts for transmitting motion from the shaft $d^2$ to the feed-cylinder are mounted in stationary bearings with the exception of the friction-wheel $i^4$, the bearing of which is movable. When the friction-wheel $i^3$ is in contact with both the friction-wheels $i^4$ and $i^5$, the operation of the feeding-cylinder will continue during the operation of the saws and float.

In order that the feeding of seed to the roll-box may automatically be stopped should an excess of seed be present in the roll-box and be resumed after the removal of such excess, I provide means whereby the position of the friction-wheel $i^4$ is governed by the quantity of seed present in the roll-box. This consists of a pivoted section J of the interior of the roll-box, rigidly secured to and mounted on a rod $j^5$, the bell-crank lever J', on which the friction-wheel $i^4$ is mounted, and the connection J² between the movable section and the bell-crank lever. The movable section is preferably arranged in the upper portion of the roll-box and is pivotally mounted in the ends thereof. Its inner face is of a shape conforming to the remainder of the inner face of the roll-box and receives against it pressure from the cotton-seed operated upon by the saws. The bell-crank lever is mounted on a stud on the side of the feeder-case and is capable of vibrating. The connection J² consists of the arm $j$, pivotally connected to the lower end of the bell-crank lever at the point $j^4$, and the curved projection $j'$, rigidly connected to the rod $j^5$ of the movable section $j$ of the movable section J. The projection $j'$ is slotted and into this projects a screw-threaded pin extending from the arm $j$. A binding-nut $j^2$ serves to retain the pin in any position in the slot to which it may be adjusted.

In the operation of the machine motion is given the saw-shaft B in the direction of the arrow in Fig. 2 from any suitable source, and the rotation of this shaft is continued during the use of the machine, as all the operative parts receive motion from it. The shaft $d^2$ is driven by the belt connecting it with the saw-shaft. The float in the roll-box receives rotation in the direction indicated by the arrow through the train of gears, and the feed-cylinder is rotated through the described connections between it and the shaft $d^2$.

When it is desired to stop the operation of the machine without stopping the revolution of the saw-cylinder, the lever $a^2$ is moved outward from the machine, bringing the cam $a'$ into contact with the lower portion of the roll-box, thus moving the float away from the saws and stopping the presentation of seed to the saws. The raising of the roll-box results, through the connection between the roll-box and the belt-tightener, in moving the latter from the belt, and thus the entire operation of the machine is stopped. When the roll-box is raised, the gear $E'$ and the lower movable portion of the gear-casing are moved with it. The gear $E'$, however, remains always in mesh with the gear $e^3$, so that immediately on the return of the parts to operative positions the rigid driving of the float is resumed.

When a greater quantity of seed than can properly be operated upon is fed into the roll-box, it results in pressure being imposed upon the movable section J, raising the latter and through the bell-crank lever and connection raises the friction-wheel $i^4$ from the friction-wheels $i^3$ and $i^5$, thus disconnecting the feed-cylinder from its source of power and stopping it. The degree of pressure of seed which may be allowed to exist in the roll-box may be regulated by adjusting the relative positions of the arm $j$ and the slotted projection $j'$.

By the described construction and arrangement of parts I secure in a simple manner means whereby the roll-box float may receive a positive motion at all times during the operation of the machine, avoiding possibility of failure to keep the mass of seed to be operated upon by the saws constantly in motion, and the rapidity of feeding seed is automatically governed by the quantity of seed in the roll-box.

Having thus described my invention, what I claim as new, and desire to secure by Letters Patent, is—

1. A cotton-seed-delinting machine comprising a series of saws, a movable roll-box arranged adjacent to the saws, a float arranged in the roll-box, a shaft having a gear thereon, a train of gears one of which is connected to the float-shaft, meshing with the gear on the shaft, the gear on the float-shaft being capable of lateral movement without disengaging it from the remainder of the train of gears, whereby the shaft and the float remain connected by the gears irrespective of the position of the roll-box, substantially as described.

2. A cotton-seed-delinting machine comprising a series of saws, a movable roll-box arranged adjacent to the saws, a float arranged in the roll-box, means for driving the float comprising a train of gears, a casing for the gears having a movable portion, whereby movement of the roll-box without disengaging the gears is permitted substantially as described.

3. A cotton-seed delinter comprising a series of saws, a movable roll-box arranged adjacent to the saws, a float arranged in the roll-box, and means for driving the float comprising a belt, a belt-tightener mounted adjacent to the belt, and a connection between the belt-tightener and the roll-box, substantially as described.

4. A cotton-seed delinter comprising a series of saws, a movable roll-box arranged adjacent to the saws, a float arranged in the roll-box, a shaft arranged above the roll-box, a belt connecting the saw-shaft and the shaft above the roll-box, gears connecting the latter shaft and the float, a belt-tightener, and a connection between the belt-tightener and the roll-box, substantially as described.

5. A cotton-seed delinter comprising a roll-box having a portion of its inner face movable, a feeder adjacent to the roll-box, means for imparting movement to the feeder comprising three friction-wheels the intermediate one being movable to bring it into and out of contact with the others, a bell-crank lever on which the movable friction-wheel is mounted, a link pivotally connected to the lower end of the bell-crank lever, and a connection rigidly connected at one end to the movable section and adjustably connected at its other end to the link, substantially as described.

In testimony whereof I affix my signature in presence of two witnesses.

JEFFERSON M. GARDNER.

Witnesses:
  MALCOLM M. SCOTT,
  EDWARD T. BRAUDEY.